United States Patent [19]

Wagner

[11] 4,291,938

[45] Sep. 29, 1981

[54] APPARATUS FOR DARK FIELD ILLUMINATION

[75] Inventor: Dietmar Wagner, Sindelfingen, Fed. Rep. of Germany

[73] Assignee: International Business Machines Corporation, Armonk, N.Y.

[21] Appl. No.: 99,052

[22] Filed: Nov. 30, 1979

[30] Foreign Application Priority Data

Feb. 12, 1978 [DE] Fed. Rep. of Germany ....... 2852203

[51] Int. Cl.³ .......................................... G02B 21/06
[52] U.S. Cl. ..................................... 350/91; 350/84
[58] Field of Search .................. 350/89, 91, 235, 236, 350/237

[56] References Cited

FOREIGN PATENT DOCUMENTS

| | | |
|---|---|---|
| 488899 | 1/1930 | Fed. Rep. of Germany ........ 350/89 |
| 34024 | 12/1964 | Fed. Rep. of Germany . |
| 1622989 | 1/1971 | Fed. Rep. of Germany . |
| 2211702 | 9/1972 | Fed. Rep. of Germany . |
| 2301597 | 7/1974 | Fed. Rep. of Germany ........ 350/91 |
| 1405241 | 5/1965 | France ................................. 360/91 |
| 2036206 | 12/1970 | France . |
| 1394743 | 5/1971 | United Kingdom . |

OTHER PUBLICATIONS

Green et al., "Magneto-Optic Detection of Ferromagnetic Domains Using Vertical Illumination", *J. of Sci. Inst.*, vol, 39, No. 5, pp. 244-245, 5/62.

H. Appelt, *Einführung In Die Mikroskopischen Untersuchungsmethoden*, 4th Ed. (Akademische Verlagsgesellschaft Geest & Portig K.-G. Leipsig 1959, pp. 103-108.

H. Naumann, *Optik Ür Konstruktcure*, (Wilhelm Knapp Verlag, Dusseldorf 1960) pp. 128-135.

*Primary Examiner*—John K. Corbin
*Assistant Examiner*—Matthew W. Koren
*Attorney, Agent, or Firm*—Ronald L. Drumheller

[57] ABSTRACT

Apparatus for dark field illumination consisting of light conducting fibers having end faces arranged within an annular region which is coaxial with the optical axis of an optical assembly, such as a microscope objective. The annular region is within the numerical aperture of the optical assembly and is positioned in the rear focal plane thereof so that light emitted by the fibers becomes dark field illumination for the object plane of the optical assembly when viewed through the central aperture of the annular region. Illumination of the object plane through the central aperture also dark field illuminates the object plane when viewed through the fibers. This is true even when the object plane is illuminated in only a small area by focussing an illumination source through the central aperture and onto the object plane.

15 Claims, 2 Drawing Figures

APPARATUS FOR DARK FIELD ILLUMINATION

DESCRIPTION

1. Technical Field

The invention relates to illumination apparatus having light conducting fiber end faces arranged in an annular area coaxial with the optical axis of an imaging optical element. It is particularly suitable for dark field illumination in microscopes.

2. Background Art

In Köhler type dark field illumination of a microscope with internal light, a light bundle travelling perpendicular to the optical axis of the microscope is deflected via a glass plate or half-angle prism arranged at 45° to the bundle axis in such a manner that the light bundle impinges the target parallel to the optical axis via a perforated lens or a ring lens and a concave mirror. This type of illumination is described, e.g., by H. Naumann and W. Knapp at page 128 of their book OPTIK FUR KONSTRUKTEURE, (Dusseldorf 1960).

In such illumination apparatus, the elements reflecting the illumination beam optically obstruct the imaging column, so that even in a sophisticated optical system of this type bright field illumination components are formed and image errors occur. This type of illumination has the further disadvantage that whenever the position of the objective is changed, the illumination beam path must also be adjusted. This applies as well to dark field illumination with external light.

Such illumination apparatus furthermore requires expensive, complicated and bulky components, which are difficult and frequently impossible to install in an existing microscope.

German Offenlegungsschrift 25 42 075 describes a device for dark field illumination of a reflected light imaging system where the laterally travelling illumination beam receives a cylindrical intensity distribution by means of a specific optical element. The illumination beam is directed onto the object to be illuminated via a deflection element, a ring lens and an objective mirror. The deflection element has a fully reflecting annular peripheral region and a semi-reflecting central region. Due to the fully reflecting annular outer area of the deflection element, the brightness in the field of the object to be exposed is increased. However, bright field components and imaging error defects are still present with this apparatus also.

All of the foregoing apparatus is inherently complicated and suffers also from the further disadvantage that the optical path lengths of the illumination beams are distributed asymmetrically around the optical axis of the microscope. This results in an asymmetric distribution of angles of incidence of the dark field illumination onto the object plane. Even with high precision adjustment of the illumination beam paths, it is frequently impossible to avoid having a disturbingly high percentage of bright field illumination as well as disturbing asymmetry of illumination.

German Auslegeschrift 22 22 378 describes an opthalmic viewing device for illuminating the retina by means of light conductors arranged annularly about the periphery of an observation lens. By means of these light conductors, a maximum homogeneous illumination of the retina is achieved, which, as is shown in particular in FIGS. 4 and 6, is substantially a bright field illumination.

German Auslegeschrift 22 11 702 describes a fiber optical illumination device where the observation beam path is concentrically surrounded by an annular array of light conducting illumination fibers. This device, too, is substantially a bright field illumination device where the illumination beams are fed from outside the objective lens onto the objective plane.

DISCLOSURE OF INVENTION

It is an object of the invention to provide uncomplicated, inexpensive apparatus for dark field illumination which also can be easily and inexpensively applied to practically any existing microscope and which is furthermore carried inside the microscope tube.

A further object is that there be no reduction of the imaging quality of the microscope, and that there be no bright field components.

Another object is to have the illumination apparatus adjusted automatically to an optimum when the microscope objective is adjusted without any further additional illumination adjustment steps being required.

Still another object is to have the illumination beams incident upon the object plane with absolutely symmetrical distribution of both intensity and angles of incidence. These objects are all achieved by this invention.

Compared with known devices for reflected light illumination, this invention is very inexpensive, very uncomplicated from a construction point of view, extremely space-saving, highly insensitive to disturbances, and does not require any adjustments even in highly different fields of use.

Any bundle of divergent light beams emitted from a point in the focal plane of an optical element is transformed by the optical element into a strictly parallel light bundle. The angle between the parallel light bundle and the optical axis of the optical element depends upon the distance between the emitting point and the optical axis. The azimuth angle of the parallel bundle varies with the azimuth angle of the emitting point. Thus, a circular array of light emitting points located at the focal plane of an optical element and concentric with the optical axis thereof will produce a multitude of light bundles impinging on an object plane on the other side all at the same angle of incidence but at various azimuth angles.

The invention approximates this situation by arranging end faces of light conducting fibers in an annular configuration and positioning it at a rear focal plane of an optical assembly, such as a microscope objective. The annular region is also within the numerical aperture of the optical assembly and coaxial therewith. In this manner an object plane on the other side of the optical assembly may be dark field illuminated uniformly by illuminating the other ends of the optical fibers, and no bright field components appear when viewing the object plane through the central aperture of the annular region irrespective of any other adjustments. If a very narrow range of dark field illumination angles of incidence is desired, the annular area may be made suitably narrow. If, on the other hand, a range of dark field illumination angles of incidence is acceptable or even desired, the width of the annular area can be increased accordingly, e.g., by an iris stop or by substituting another fiber carrying annulus of different width or by adding one or more further fiber carrying annular regions of either increasing or decreasing diameter.

It is also possible to energize or feed light to only individual parts of the fiber carrying annular area, e.g., parts facing each other diametrically, so that dark field illumination is obtained with light impinging from only one, two or a few selected directions. This can be of advantage in detecting structures extending in only predetermined directions. Such objects appear in aligning exposure masks used in the production of integrated circuits. The pattern structures of such masks extend mainly or exclusively in two directions which are perpendicular to each other, while alignment markings on such masks are rotated in orientation 45° from these directions so as to make the marks more visible in an alignment microscope.

For examining and analyzing edge forms, an illumination is required from different azimuth directions and at different angles of incidence. The present invention is particularly suitable for such tasks since the azimuth angle or angles and ranges thereof as well as the angle or angles of incidence and ranges thereof may be controlled. A further feature of the invention contemplates shifting the annular area along the optical axis. In this fashion it is possible to change continuously from a dark field illumination to a bright field illumination, and vice versa. The present invention is not restricted to use in microscopes only. It may also be utilized with particular advantage in connection with many other scanning and observation devices. For example, the invention is particularly suitable for finding and detecting edges, surface roughness, surface discontinuities, and other surface disturbances.

It is also possible in accordance with a further embodiment of this invention to optically reverse the above described system by illuminating through the central aperture of the annular region and by detecting rather than emitting light through the light conducting fibers at the annular region.

Here again, it is possible to establish a preferential direction for observation by detecting light only in individual azimuth sectors.

BRIEF DESCRIPTION OF THE DRAWINGS

The invention will now be described by reference to the drawings in which.

DETAILED DESCRIPTION OF PREFERRED EMBODIMENTS

Figure 1:
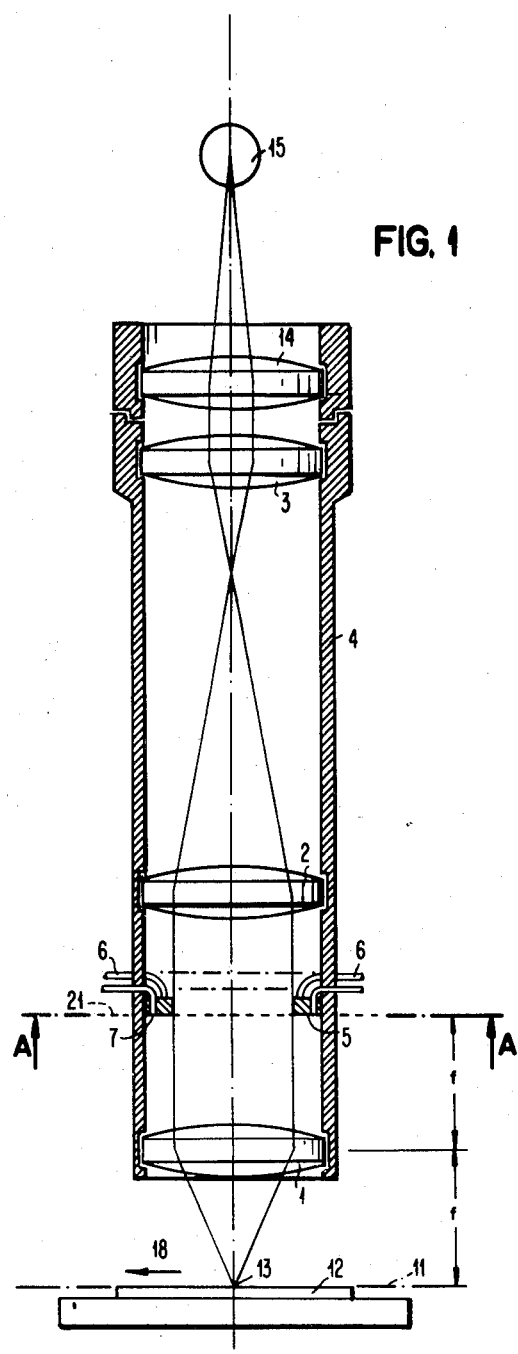
FIG. 1 is a sectional view through a microscope incorporating illumination apparatus in accordance with the invention.
Figure 2:
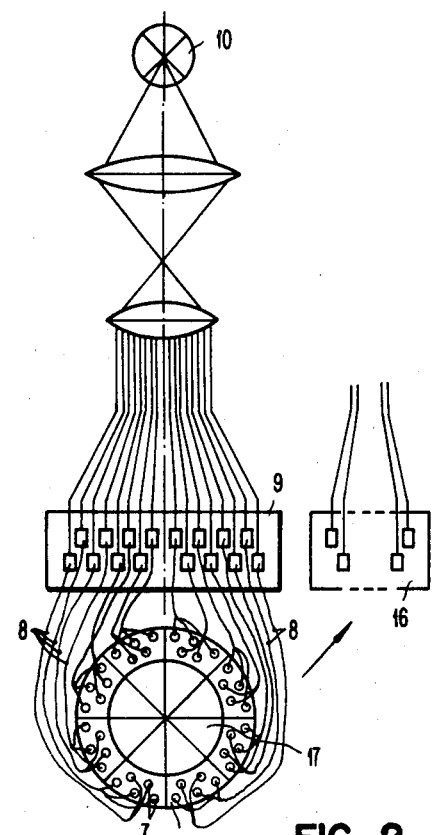
FIG. 2 is a sectional view through the device of FIG. 1 along line A . . . A.

The device of FIG. 1 consists of a microscope tube 4 containing an objective 1, a tube lens 2, and an eyepiece 3. Above eyepiece 3, a condenser lens 14 is furthermore provided through which divergent beams emanating from a point-shaped light source in area 15 may be collected into the eyepiece for focusing onto an object plane 12, or through which beams leaving eyepiece 3 may be focused into a detector at 15. At focal plane 21 of objective 1, apparatus 5 is arranged inside tube 4. Apparatus 5 comprises a plurality of light conducting fibers 6 having end faces 7 arranged in an annular configuration. Light conducting fibers 6 are preferably glass fibers or glass fiber bundles. This apparatus may consist of a synthetic ring with an array of annularly arranged holes containing individual light fibers 6. It is also possible to arrange a suitable number of light fibers 6 in an annular configuration as shown, and to bond them together with a suitable bonding material. As shown in FIG. 2, light fibers 6 are divided into eight sectors 17 and into inner and outer ring portions or circles. As schematically shown in FIG. 2, the light fibers of each inner and/or each outer ring portion of a sector are combined into individual light fiber bundles 8, which via suitable light switches in unit 9 are connectable to a light source 10 individually or in any discretionary combination. It is, of course, also possible to connect each individual sector and each individual ring portion thereof to different individually energizable light sources.

When all light fibers 6 are connected to light source 10, an annular light distribution is formed in rear focal plane 21 of objective 1, with the effect that there exits from objective 1 a multitude of beam bundles each consisting practically of only parallel light beams. The light bundles impinging on object plane 12 of the objective have approximately the same angles of incidence but different azimuth angles. Object plane 12 is preferably close to the front focal plane 11 of the objective. In the absence of condenser lens 14, an observer behind eyepiece 3 sees only scattered light and no reflected light. A smooth object surface at the object plane scatters very little light; so an observer would see practically no light if the object surface is smooth. On the other hand, each disturbance on an object surface at the object plane 12 causes a scattering or a lateral reflection of the light which makes it visible to the observer. A light detector may be used instead to sense the presence of light.

If, on the other hand, a spot-like light source is arranged at 15 and collected by condenser lens 14, the light passing through objective 1 may be focused at point 13 on object plane 12 into an Airy disk. If an object surface at object plane 12 is smooth, the entire light reflected from point 13 passes back through the central aperture of apparatus 5. If, however, there is a roughness or discontinuity on the object surface within the area of the Airy disk generated by the objective, scattered light reaches the area of end faces 7 of light conducting fibers 6 and may be sensed at the other ends thereof. Light fibers 6 may be connected to one or more other light conductors via suitable switches assembled into a group 16. By scanning or moving the object surface in the direction of arrow 18, each individual disturbance on the object surface can be sensed and located with high precision, since only surface roughness or discontinuities reaching the area of the Airy disk cause scattering of light into light conductors 6.

Instead of having a stationary spot-like light source at 15, a scanning light source may be used, e.g., in the manner of a television raster, producing in the object plane of objective 1 a correspondingly scanning Airy disk. It is possible to have a scanning Airy disk with a stationary object surface, or a scanning Airy disk may be used to rapidly scan a small zone or partial area of the object plane 12 while the object surface itself is moved over larger distances. By suitably correlating the scanning of the Airy disk across the object surface with the outputs of light conductors 6, it is possible to obtain precise data on the presence and locations of disturbances in the surfaces scanned. By using light outputs coming from only one or a selected few of the sectors 17, it is possible to quite clearly emphasize discontinuities such as lines or edges having specific orientation.

Having thus described my invention, what I claim as new and desire to secure by Letters Patent is:

1. Dark field illumination apparatus comprising:
   an optical assembly defining a focal plane on one side thereof and having an object plane on the other side thereof;
   means dividing the portion of said focal plane which is within the numerical aperture of said optical assembly into an annular region coaxial with the optical axis of said optical assembly and a central aperture region surrounded by said annular region;
   a plurality of light conducting fibers each having one end face disposed within said annular region and directed toward said optical assembly; and
   means for illuminating the other end faces of said light conductors, said object plane being dark field illuminated thereby when viewed through said central aperture region of said focal plane.

2. Dark field illumination apparatus as defined in claim 1 wherein said optical assembly is a lens assembly.

3. Dark field illumination apparatus as defined in claim 2 wherein said lens assembly consists of a single lens element.

4. Dark field illumination apparatus as defined in claim 1 wherein said optical assembly is an objective of a microscope.

5. Dark field illumination apparatus as defined in claim 1 wherein said object plane is in the vicinity of a focal plane of said optical element.

6. Dark field illumination apparatus comprising:
   an optical assembly defining a focal plane on one side thereof and having an object plane on the other side thereof;
   means dividing the portion of said focal plane which is within the numerical aperture of said optical assembly into an annular region coaxial with the optical axis of said optical assembly and a central aperture region surrounded by said annular region;
   a plurality of light conducting fibers each having one end face disposed within said annular region and directed toward said optical assembly; and
   means for illuminating at least a portion of said object plane through said central aperture region of said focal plane, said object plane being dark field illuminated thereby when viewed through said light conducting fibers.

7. Dark field illumination apparatus as defined in claim 6 wherein said optical assembly is a lens assembly.

8. Dark field illumination apparatus as defined in claim 7 wherein said lens assembly consists of a single lens element.

9. Dark field illumination apparatus as defined in claim 6 wherein said object plane is in the vicinity of a focal plane of said optical element.

10. Dark field illumination apparatus as defined in claim 6 wherein only a small spot region of said object plane is illuminated at one time.

11. Dark field illumination apparatus as defined in claim 10 and further comprising means for varying the position in said object plane of said illuminated spot region.

12. Dark field illumination apparatus as defined in claim 6 wherein said means for illuminating comprises means for causing illumination light coming through said central aperture region to become focussed to a small spot at said object plane.

13. Dark field illumination apparatus as defined in claim 6 wherein said means for illuminating comprises a point-like source of light and means for imaging said point-like source through said central aperture region and onto said object plane.

14. Dark field illumination apparatus as defined in claim 6 and further comprising means for varying the position of the image of said point-like source with respect to an object in said object plane.

15. Dark field illumination apparatus as defined in claim 14 wherein said means for varying the position of the image of said point-like source with respect to the object in said object plane includes means for physically moving said object within said object plane.

* * * * *